(12) United States Patent
Lin et al.

(10) Patent No.: US 9,939,715 B2
(45) Date of Patent: Apr. 10, 2018

(54) PROJECTION SYSTEM, PROJECTION DEVICE AND DISPLAY RACK

(71) Applicant: Young Optics Inc., Hsinchu (TW)

(72) Inventors: Ching-Lun Lin, Hsinchu (TW); Ming-Chi Chen, Hsinchu (TW); Ya-Ling Hsu, Hsinchu (TW); Wen-Hao Hsu, Hsinchu (TW); Chao-Shun Chen, Hsinchu (TW); Wei-Hung Tsai, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 213 days.

(21) Appl. No.: 14/980,972

(22) Filed: Dec. 28, 2015

(65) Prior Publication Data
US 2016/0238920 A1    Aug. 18, 2016

(30) Foreign Application Priority Data

Feb. 13, 2015    (CN) .......................... 2015 1 0078836

(51) Int. Cl.
*G03B 21/14* (2006.01)
*G03B 21/10* (2006.01)
(Continued)

(52) U.S. Cl.
CPC ............ *G03B 21/10* (2013.01); *G03B 21/005* (2013.01); *G03B 21/147* (2013.01); *G03B 21/28* (2013.01); *G09F 19/18* (2013.01)

(58) Field of Classification Search
CPC ........ G03B 21/10; G03B 21/14; G03B 21/56; G09F 19/18; G09F 23/06
See application file for complete search history.

(56) References Cited

U.S. PATENT DOCUMENTS 7,696,897 B2 *  4/2010  Horii ..................... G03B 21/13
                                                    340/5.91
7,832,874 B2 * 11/2010  Ikeda ..................... A47F 3/001
                                                    353/74
(Continued)

FOREIGN PATENT DOCUMENTS

CN        101773346 A  †   7/2010
CN        101943848 A  †   1/2011
(Continued)

OTHER PUBLICATIONS

State Intellectual Property Office of the People's Republic of China, "Office Action", dated Jun. 1, 2017.†
(Continued)

*Primary Examiner* — William C Dowling
(74) *Attorney, Agent, or Firm* — WPAT, PC

(57) ABSTRACT

A projection device is disposable into a display platform of a display rack having a plurality of display platforms, for directly projecting an image frame onto a projection screen of the display platform. The image frame projected to the projection screen is not reflected by any reflective mirror arranged between the projection device and the projection screen. A length of the image frame in a first direction is equal to at least ten times a length of the image frame in a second direction. Since no reflective mirror is arranged between the projection device and the projection screen, the projection device is more easily applicable to display racks.

20 Claims, 14 Drawing Sheets

(51) Int. Cl.
 *G03B 21/28* (2006.01)
 *G09F 19/18* (2006.01)
 *G03B 21/00* (2006.01)

(56) References Cited

U.S. PATENT DOCUMENTS

| | | | |
|---|---|---|---|
| 7,954,959 B2 * | 6/2011 | Ikeda | A47F 5/0018 353/74 |
| 7,997,734 B2 * | 8/2011 | Mochizuki | G09F 19/18 340/5.91 |
| 8,047,657 B2 † | 11/2011 | Ikeda et al. | |
| 9,703,179 B2 * | 7/2017 | Bonner | G03B 21/10 |
| 2007/0229767 A1 * | 10/2007 | Ikeda | A47F 5/0018 353/28 |
| 2013/0176398 A1 † | 7/2013 | Bonner et al. | |
| 2015/0294606 A1 * | 10/2015 | Bazos | G09F 19/228 353/28 |

FOREIGN PATENT DOCUMENTS

| | | | |
|---|---|---|---|
| JP | 2012032613 A | † | 2/2012 |
| TW | M426771 | † | 4/2012 |

OTHER PUBLICATIONS

State Intellectual Property Office of the People's Republic of China , "Office Action", dated Dec. 11, 2017.†

* cited by examiner
† cited by third party

US 9,939,715 B2

PROJECTION SYSTEM, PROJECTION DEVICE AND DISPLAY RACK

FIELD OF THE INVENTION

The present invention relates to a projection device, and more particularly to a projection device which can be disposed into display platforms of display racks.

BACKGROUND OF THE INVENTION

Display racks in stores accommodate diverse products for consumers to choose from. In order to clearly notify customers of names, prices or other data of the products, stickers are usually disposed in front of the products for labeling the names, prices or other data of the products. However, prices are adjusted often and positions of products also change often, therefore great amount of labor is required to replace the stickers. Replacing stickers is prone to delay and error. Moreover, stickers can fall off from the racks.

Currently, electronic shelf labels (ESL) and electronic paper are used to display product data, replacing the practice of using stickers as labels. However, electronic shelf labels and electronic papers have limited resolution and cannot display color images. Due to these limitations, electronic shelf labels and electronic papers are constrained to displaying product names, prices, and few other data.

Additionally, TIPO publications TW 1231401, TW 1243276, TW 1287119, TW 1283793, TW 1275895, TWM327045, TW M328591 and TIPO application TW 104101729 discloses features relating to projection devices. Also, SIPO publication CN 101773346, USPTO publications U.S. Pat. Nos. 7,832,874 and 8,047,657, and USPTO application 20130176398 further discloses arranging projection devices on display racks. However, these techniques require arranging of a reflective mirror between a projection device and a projection screen on a display rack, for reflecting light from the projection device onto the projection screen to display image frames. Application of reflective mirrors not only increases cost and space needed for accommodation, but also need to be precisely arranged in spite of potential outside impact which display racks are susceptible to. Therefore, doing away with reflective mirrors arranged between projection devices and projection screens on display racks is a problem to be solved.

SUMMARY OF THE INVENTION

An embodiment of the present disclosure provides a projection device disposable into a display platform of a display rack, for projecting to a projection screen of the display rack an image frame having a large height to width ratio.

An embodiment of the present disclosure provides a projection device disposable into a display platform of a display rack having a plurality of display platforms, for directly projecting to a projection screen of the display rack an image frame. The image frame projected to the projection screen is not reflected by any reflective mirror arranged between the projection device and the projection screen. A length in a first direction of the image frame projected by the projection device is equal to or greater than 10 times a length in a second direction of the image frame projected by the projection device.

Since the length in the first direction of the image frame projected by the projection device is equal to or greater than 10 times the length in the second direction of the image frame projected by the projection device, the projection device is capable of projecting to the projection screen of the display rack the image frame having the large height to width ratio.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1:
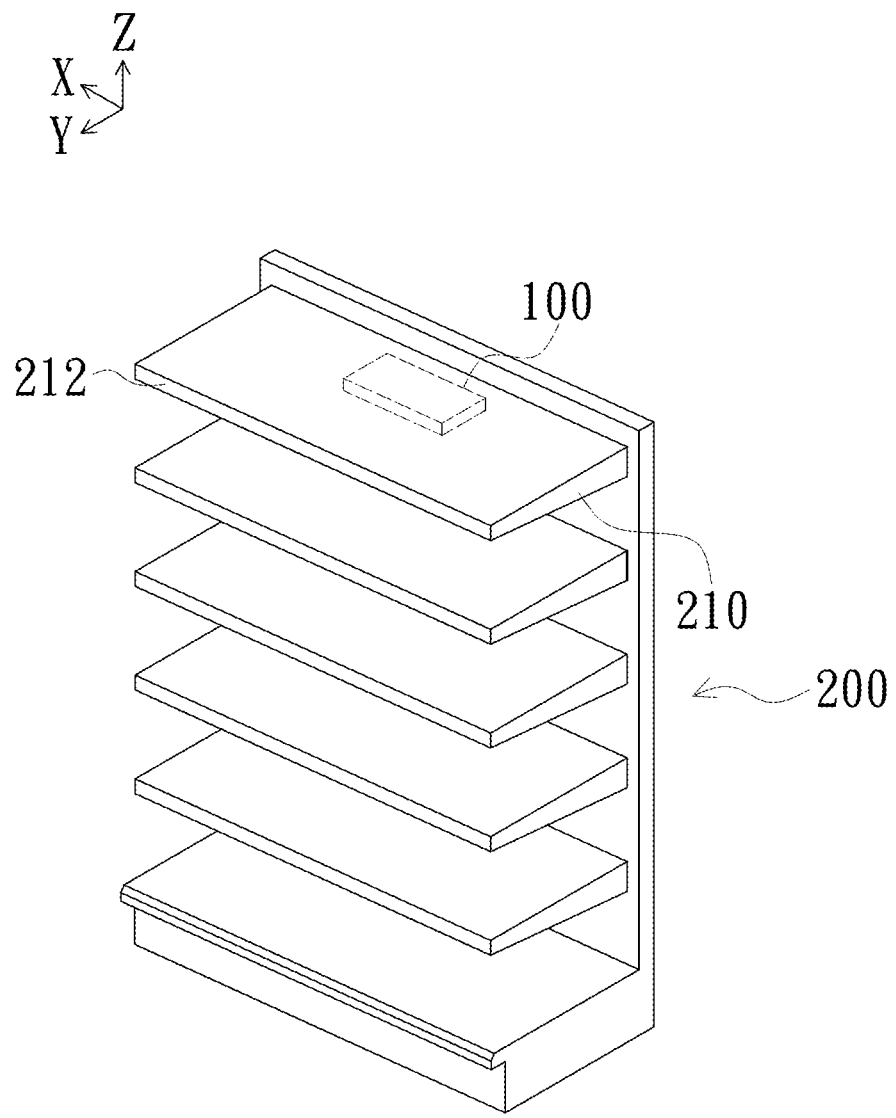
FIG. 1 shows a schematic diagram of a projection device disposed into a display rack according to an embodiment of the present disclosure.

FIG. 1 shows a schematic diagram of a projection device disposed into a display rack according to an embodiment of the present disclosure. Referring to FIG. 1, a projection device 100 of the present embodiment disposable into a display platform 210 of a display rack 200 having a plurality of display platforms 210, for projecting to a projection screen 212 of the display rack 200 an image frame. The display platform 210 displays for example products for consumers to purchase. The projection device 100 projects image frames onto the projection screen 212, for displaying names, prices or other data of products. In FIG. 1, the projection screen 212 is parallel to an X-Z plane of a Cartesian coordinate system having an X axis, a Y axis and a Z axis perpendicular to each other. In other embodiments, the projection screen 212 can have a curved shape or other shape. The projection screen 212 can be slanted with respect to the X-Y plane, the X-Z plane or the Y-Z plane. In an embodiment wherein the lengths of the entire display platform 210 in the direction of the Z axis are equal, the length of the projection device 100 in the direction of the Z axis is smaller than the length of the projection screen 212 in the direction of the Z axis, such that the projection device 100 can be accommodated into the display platform 210. The present disclosure does not limit that the lengths of the entire display platform 210 in the direction of the Z axis are equal.

The length of the projection screen 212 of the display platform 210 in the direction of the X axis is much greater than the width of the same in the direction of the Z axis. Therefore, in order for the image frame projected by the projection device 100 to correspond to the length to width ratio of the projection screen 212, the selected projection device 100 projects image frames whose length in a first direction (e.g. length parallel to the X axis) is at least ten times its length in a second direction (e.g. length parallel to the Z axis). Moreover, in order to satisfy demands for brightly lit image frames, the F number of the projection lens of the projection device 100 is for example smaller than or equal to 2.0. Additionally, the length of the display platform 210 parallel to the Y axis is limited, limiting the distance between the projection device 100 and the projection screen 212. In order to project a sufficiently large image frame within a limited distance, the throw ratio of the projection lens of the projection device 100 is for example smaller than or equal to 0.4. Additionally, if data displayed by the image frames include bar codes, quick response codes (QR codes), or other data requiring higher resolution, projection lens having resolution greater than or equal to 1080P or DPI (dots per inch) can be used to clearly display details of the image frames. 1080P is a common display specification, and is not further detailed herein.

Figure 2A:
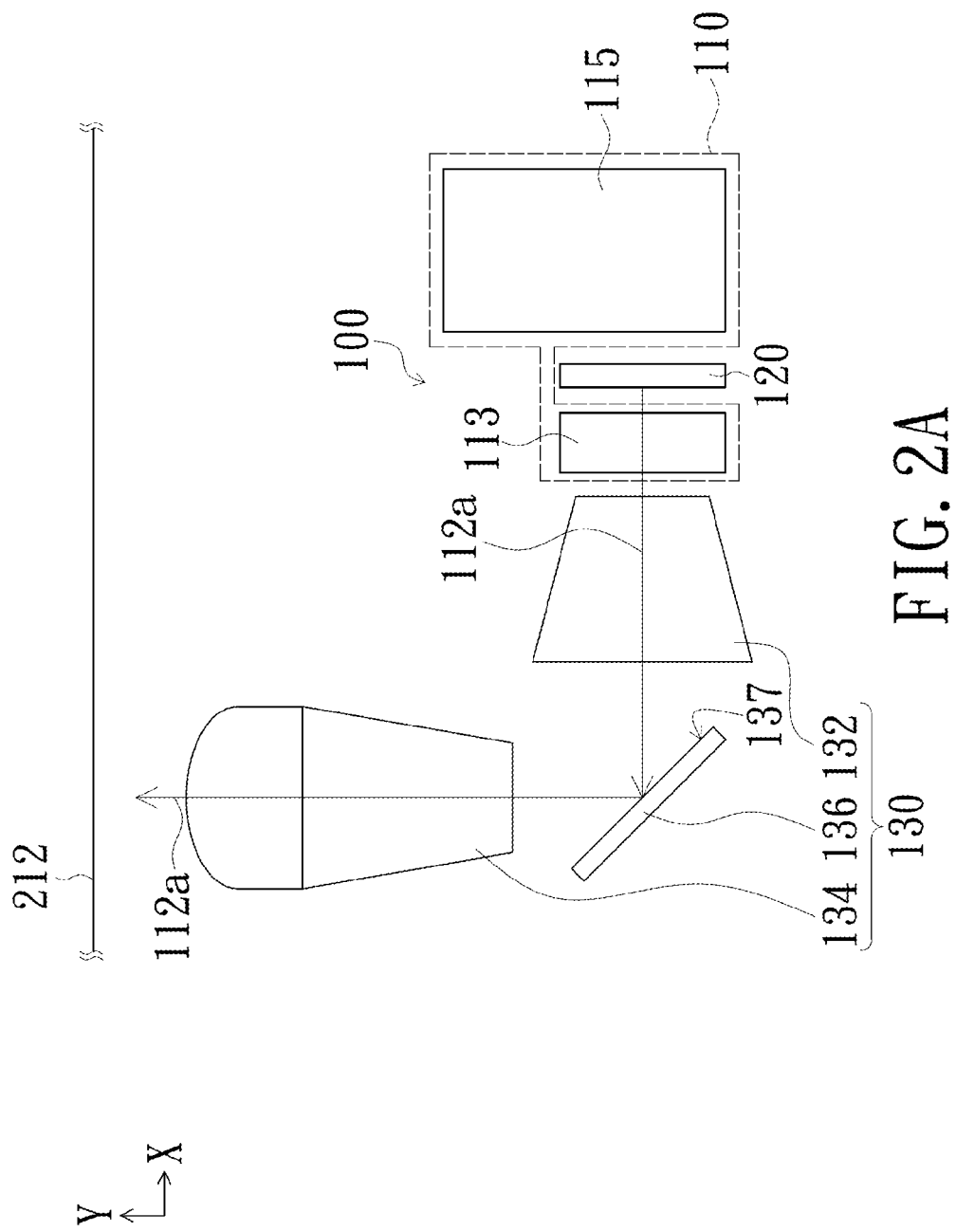
FIG. 2A and FIG. 2B show a schematic top view and a schematic side view, respectively, of a projection device according to an embodiment of the present disclosure.
Figure 2B:
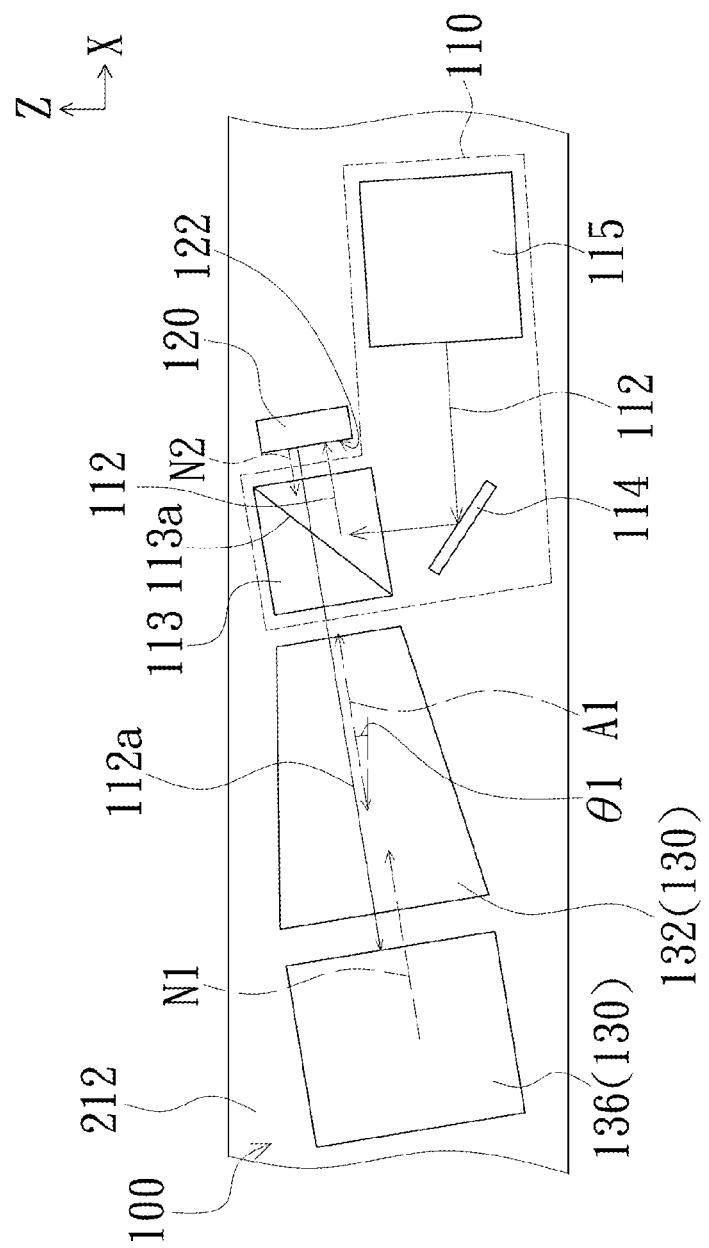

In order to satisfy the aforementioned requirements, the length to width ratio of the image frames projected is for example greater than or equal to 10 and no reflective mirror is arranged between the projection device and the projection screen of the display rack. Therefore, the corresponding light valve must also have high length to width ratios. Also, the interior space of the display platform of the display rack is limited, so the light transmitting and reflecting element and the illumination system cannot be arranged according to conventional techniques. The following describes the structure of the projection device 100 of the present embodiment for overcoming the aforementioned problems. FIG. 2A and FIG. 2B show a schematic top view and a schematic side view, respectively, of a projection device according to an embodiment, and the relative positions of the projection device and the projection screen. The projection device 100 of the present embodiment includes an illumination system 110, a light valve 120 and a projection lens 130. The illumination system 110 provides an illumination light beam 112. The light valve 120 is arranged on the transmission path of the illumination light beam 112, for converting the illumination light beam 112 to an image light beam 112a. The light valve 120 can be a digital micro-mirror device (DMD), a liquid crystal on silicon panel (LCoS panel), or other reflective light valves. In other embodiments, a transmissive light valve can be used, as long as the projection device and other components are according repositioned. The projection lens 130 is arranged on the transmission path of the image light beam 112a, for projecting the image light beam 112a onto the projection screen 212, forming an image frame thereon.

In an embodiment, the projection lens 130 includes a first lens group 132, a second lens group 134, and a first reflective element 136 arranged between the first lens group 132 and the second lens group 134. The first lens group 132 is arranged along a first direction (e.g. direction of the X axis). The second lens group 134 is arranged along a third direction (e.g. direction of the Y axis). The first lens group 132 and the second lens group 134 each include at least one lens. The image light beam 112a sequentially passes through the first lens group 132, a reflective face 137 of the first reflective element 136, and the second lens group 134 and is projected onto the projection screen 212.

Referring to FIG. 2B, in order for overall height (parallel to the Z axis) of the projection device 100 to be smaller than the height (parallel to the Z axis) of the projection screen 212, the first reflective element 136 is rotated about the Y axis, such that the normal direction N1 of a reflective face 137 of the first reflective element 136 (backside of the first reflective element 136 shown in FIG. 2B) and the X-Y plane of the abovementioned Cartesian coordinate system includes an acute angle, and that the normal direction N2 of a object face 122 of the light valve 120 and the optical axis A1 of the first lens group 132 are parallel to the normal direction N1 of the reflective face 137, wherein the object face 122 faces the projection lens 130. In other words, the first reflective element 136, the first lens group 132, and the light valve 120 are arranged slantedly with respect to the X-Y plane, so as to make room under the light valve 120 for accommodating part of the illumination system 110. The illumination system 110 is further detailed below.

Figure 3:
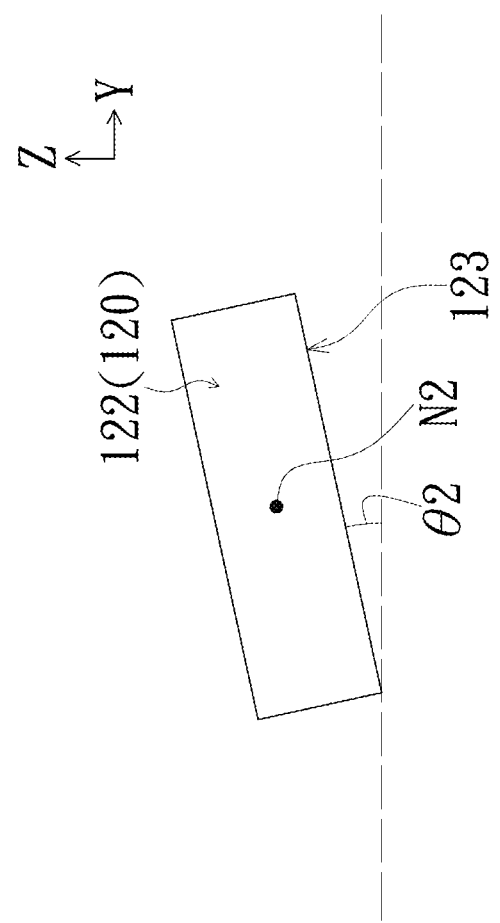
FIG. 3 shows a schematic diagram of a rotated light valve according to an embodiment of the present disclosure.

In the present embodiment, the optical axis A1 of the first lens group 132 and the first direction (e.g. direction of X axis) include a first angle $\theta 1$. The first angle $\theta 1$ preferably satisfies the following formula, but is not limited thereby: $3° \leq (0.72 \times |\theta 1| \times L)/(H \times f/\#) \leq 8°$. In the above inequality, L is the distance between the center of the reflective face 137 of the first reflective element 136 and the center of the object face 122 of the light valve 120, H is the height of the projection screen 212 in the second direction (direction of Z axis), f/# is the F number of the projection lens 130. Additionally, since rotation of the first reflective element 136 about the Y axis distorts the image frame, the light valve 120 can be rotated as well to correct the distortion. Specifically, referring to FIG. 3, which shows a schematic diagram of a rotated object face 122 of the light valve 120. The object face 122 of the light valve 120 is for example rectangular, and the light valve 120 is rotated by a second angle $\theta 2$ about the normal direction N2 of the object face 122 from a position where a long edge 123 of the object face 122 is parallel to the X-Y plane, such that the long edge 123 of the object face 122 and the third direction (direction of Y axis) include the second angle $\theta 2$, wherein the first angle $\theta 1$ and the second angle $\theta 2$ are equal.

The following describes the illumination system 110 of the projection device 100 of the present embodiment. Referring to FIG. 2A and FIG. 2B again, the illumination system 110 of the present embodiment includes a light transmitting and reflecting element 113, a second reflective element 114 and other components included by a section 115. The light transmitting and reflecting element 113 is arranged between the light valve 120 and the projection lens 130, for reflecting the illumination light beam 112 to the light valve, and transmitting the image light beam 112a to the projection lens 130. Specifically, the light transmitting and reflecting element 113 has a light splitting face 113a for reflecting the illumination light beam 112 to the light valve 120 and transmitting the image light beam 112a to the projection lens 130. The light splitting face 113a is for example perpendicular to the X-Z plane.

The second reflective element 114 is arranged under the light transmitting and reflecting element 113 along the Z axis, for reflecting the illumination light beam 112 to the light transmitting and reflecting element 113. The light transmitting and reflecting element 113 can be a total internal reflection prism, a reverse total internal reflection prism, a polarization beam splitter, etc., selected according to the type of the light valve 120. Additionally, in order to improve quality, the illumination system 110 can include field lens (not shown in the figure) selectively arranged between the light transmitting and reflecting element 113 and the light valve 120.

Figure 4:
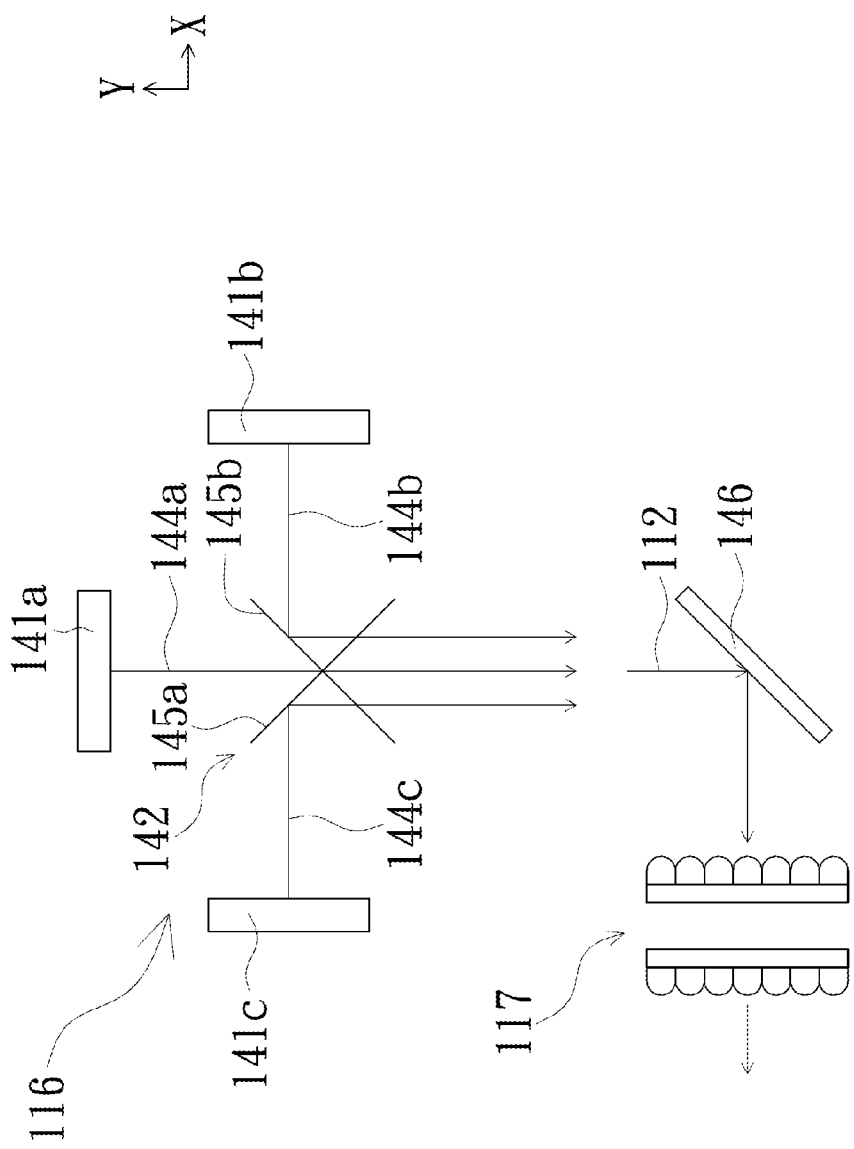
FIG. 4 shows a schematic top view of components included in a section 115 of FIG. 2A and FIG. 2B.

FIG. 4 shows a schematic top view of components included in the section 115 of FIG. 2A and FIG. 2B. Referring to FIG. 4, the section 115 of FIG. 2A and FIG. 2B includes a light source module 116 and a light uniforming element 117. The light source module 116 provides an illumination light beam 112. The light source module 116 includes a plurality of light emitting assemblies for providing illumination light beams of different colors, such as light emitting assemblies 141a, 141b, 141c, and a light combining element 142 arranged between the light emitting assemblies 141a, 141b, 141c. The light emitting assemblies 141a, 141b, 141c each include at least one light emitting element, which can be a light emitting diode but is not limited thereto. The light emitting assemblies 141a, 141b, 141c are used to provide illumination light beams of different colors. For example, the light emitting assembly 141a provides a first color light beam 144a, the light emitting assembly 141b provides a second color light beam 144b, and the light emitting assembly 141c provides a third color light beam 144c. The first color light beam 144a, the second color light beam 144b and the third color light beam 144c are for example red, green and blue respectively. Lenses (not shown in the figure) can be arranged between the light combining element 142 and the light emitting assemblies 141a, 141b, 141c respectively. Additionally, the light combining element 142 can be for example an x-type combiner cube including a first color plate 145a and a second color plate 145b. The first color plate 145a reflects the third color light beam 144c, and allows the first color light beam 144a to pass through. The second color plate 145b reflects the second color light beam 144b, and allows the first color light beam 144a to pass through. The abovementioned illumination light beam 112 includes the first color light beam 144a, the second color light beam 144b and the third color light beam 144c. Of particular note, even though the light combining element 142 of the present embodiment is an x-type combiner, other types of combiners (e.g. prism lens) can be used.

Figure 5:
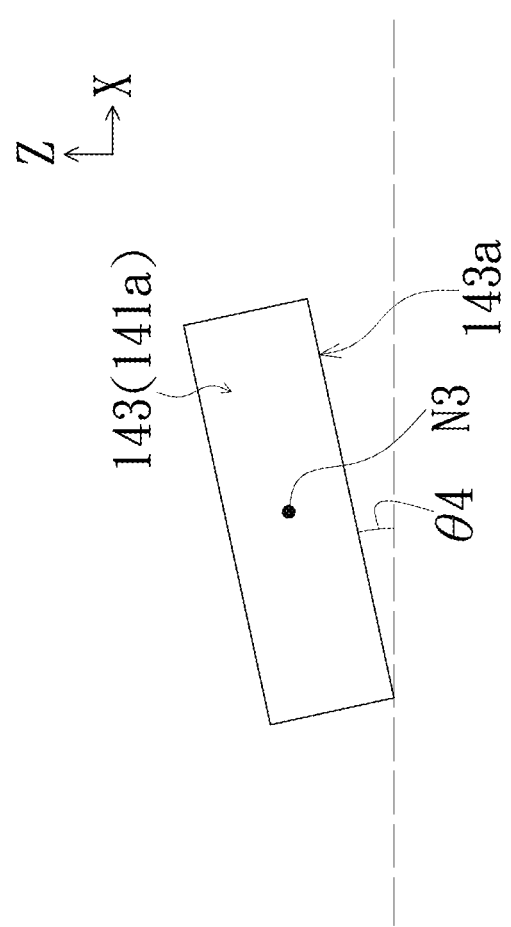
FIG. 5 shows a schematic diagram of a rotated light emitting assembly according to an embodiment of the present disclosure.

Since rotation of the first reflective element 136 about the Y axis distorts the image frame, the light valve 120 and the light emitting assemblies 141a, 141b, 141c can be rotated as well to correct the distortion. Referring to FIG. 5, the light emitting assembly 141a has a rectangular light emitting face 143. The light emitting assembly 141a is rotated by a fourth angle θ4 about the normal direction N3 at the center of the light emitting face 143 of the light emitting assembly 141a from a position where a long edge 143a of the light emitting face 143 is parallel to the X-Y plane, such that the long edge 143a of the light emitting face 143 and the first direction (direction of X axis) include the fourth angle θ4, wherein the first angle θ1 and the fourth angle θ4 are equal. In other words, the light emitting assemblies 141a, 141b, 141c are rotated by the fourth angle θ4 about the normal directions N3 at the centers of their respective light emitting faces 143, such that the lengths 143a of the light emitting faces 143 and the X-Y plane include the fourth angle θ4. Of particular note, according to design of the structure, rotation of the light emitting assemblies 141a, 141b, 141c may not be necessary. Referring to FIG. 2B and FIG. 4, the light uniforming element 117 is arranged between the light source module 116 and the second reflective element 114. The light source module 116 for example includes a third reflective element 146 arranged between the light combining element 142 and the light uniforming element 117, for reflecting the illumination light beam 112 to the light uniforming element 117. The light uniforming element 117 is for example a micro-lens array. When using a single micro-lens array, the thickness of the micro-lens array needs to be high enough to achieve an effect of diffusion. In order to reduce the thickness of the light uniforming element 117, two micro-lens arrays may be used and arranged with a distance therebetween, such that the thickness of each of the micro-lens arrays can be reduced. Additionally, the light uniforming element 117 can also be a light integration rod or other components having similar functions.

Figure 6:
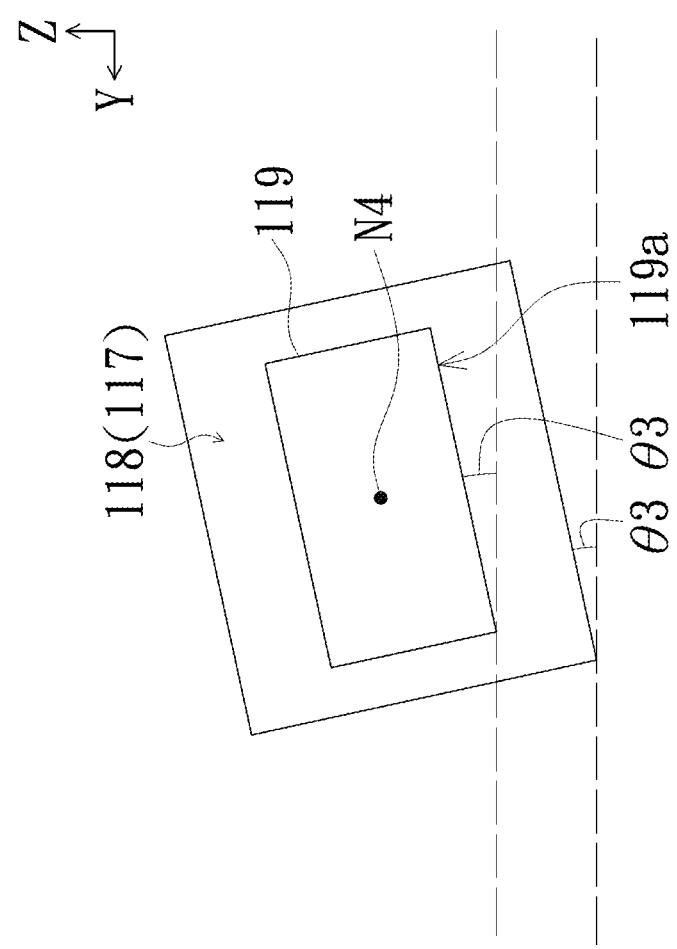
FIG. 6 shows a schematic diagram of a rotated light uniforming element according to an embodiment of the present disclosure.

Since rotation of the first reflective element 136 about the Y axis distorts the image frame, in addition to rotating the light valve 120 and the light emitting assemblies 141a, 141b, 141c to correct the distortion, the light uniforming element 117 also needs to be rotated. Specifically, referring to FIG. 6, the light uniforming element 117 has a light emitting face 118, and the illumination light beam 112 forms a rectangular lighted area 119 at the light emitting face 118. The light uniforming element 117 is rotated by a third angle θ3 about the normal direction N4 at the center of the light emitting face 118 from a position where an edge 119a of the lighted area 119 is parallel to the X-Y plane, such that the edge 119a and the third direction (direction of Y axis) include the third angle θ3, wherein the first angle θ1 and the third angle θ3 are equal. Additionally, the light emitting face 118 and the third direction (direction of Y axis) also include the third angle θ3.

Figure 7A:
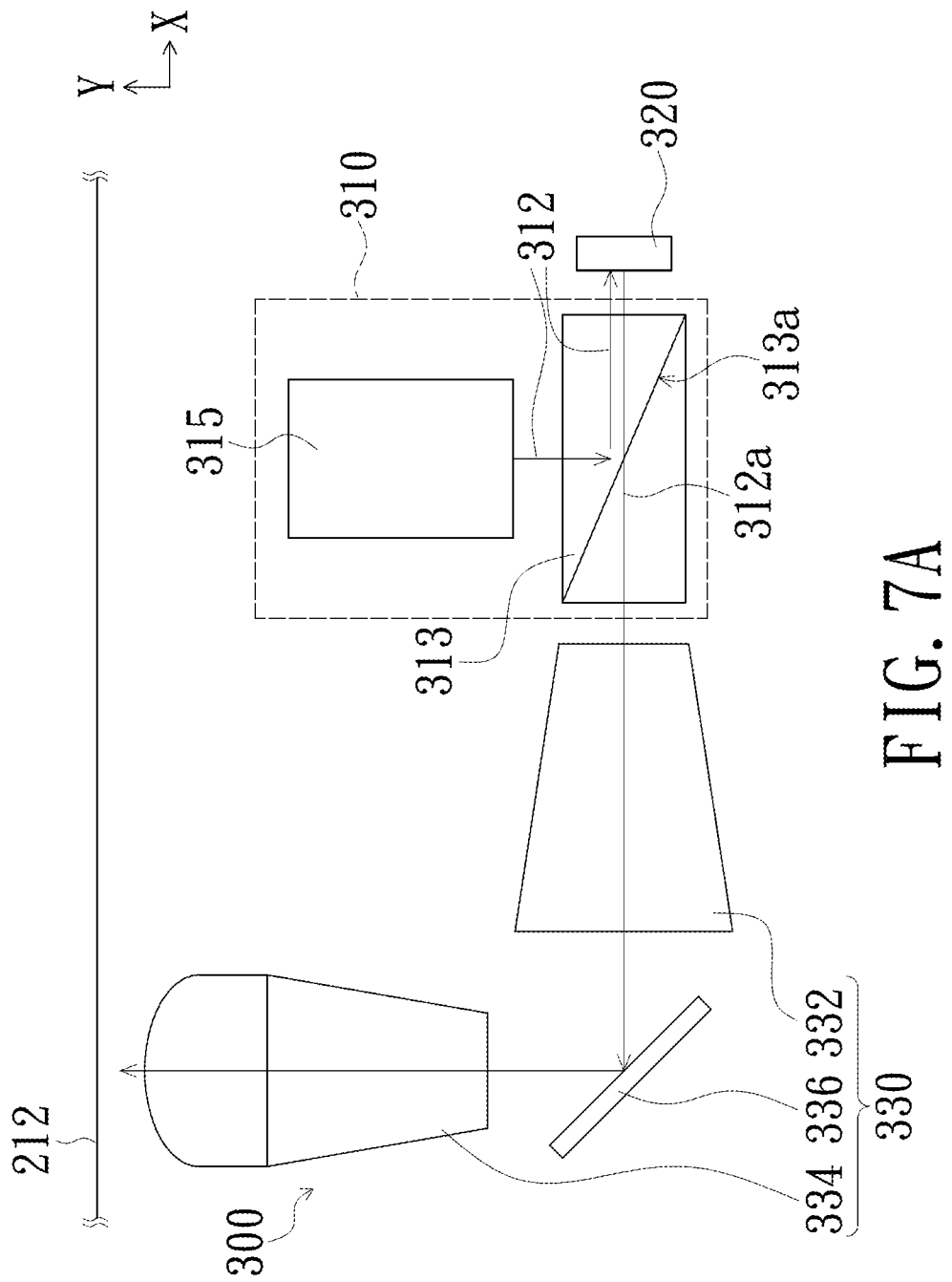
FIG. 7A and FIG. 7B show a schematic top view and a schematic side view, respectively, of a projection device according to an embodiment of the present disclosure.
Figure 7B:
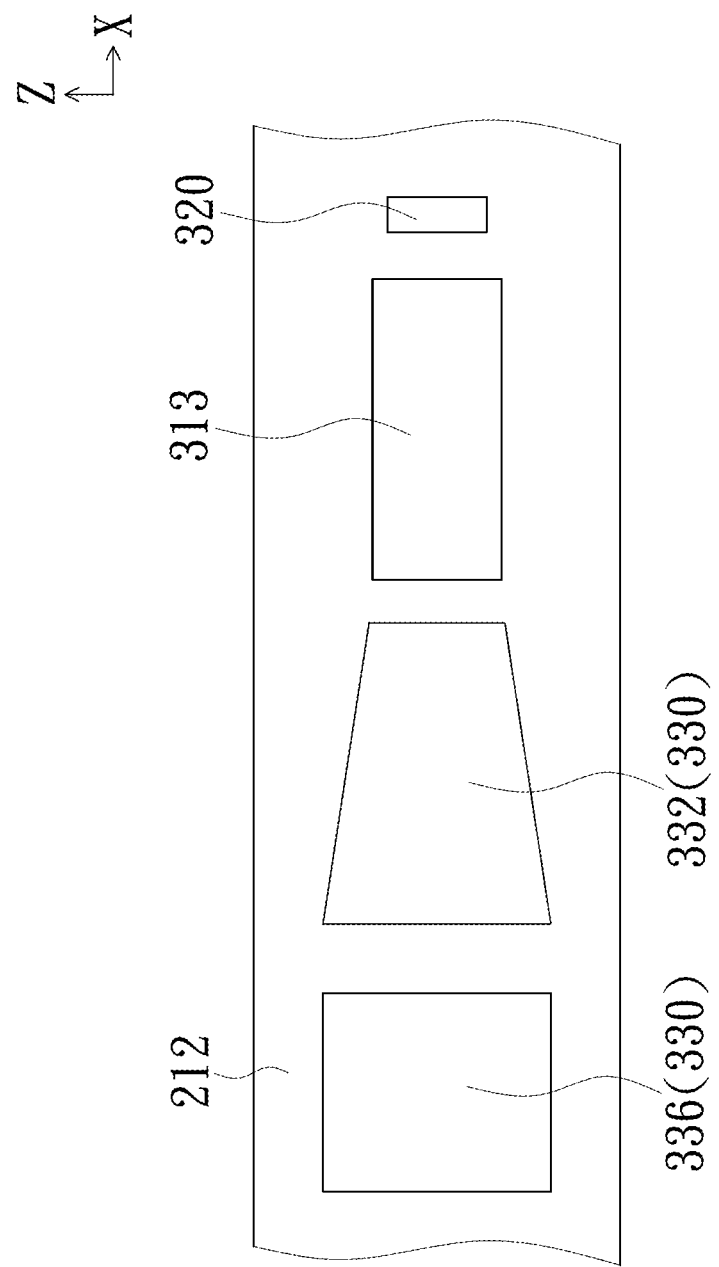

FIG. 7A and FIG. 7B show a schematic top view and a schematic side view, respectively, of a projection device according to another embodiment of the present disclosure. FIG. 7A and FIG. 7B show relative positions of the projection device and the projection screen. Referring to FIG. 7A and FIG. 7B, the projection device 300 of the present embodiment is similar to the abovementioned projection device 100, and can be accommodated into the display platform 210 of FIG. 1. The projection device 300 includes an illumination system 310, a light valve 320, and a projection lens 330. The illumination system 310 provides an illumination light beam 312. The light valve 320 is arranged on the transmission path of the illumination light beam 312, for converting the illumination light beam 312 to an image light beam 312a. The projection lens 330 is arranged on the transmission path of the image light beam 312a, for projecting the image light beam 312a to the projection screen 212, thereby forming an image frame at the projection screen 212. The projection lens 330 of the present embodiment includes a first lens group 332 arranged along the direction of the X axis, a second lens group 334 arranged along the direction of the Y axis, and a first reflective element 336 arranged between the first lens group 332 and the second lens group 334.

The illumination system 310 includes a light transmitting and reflective element 313 and components included by a section 315 Similar to the components included by the section 115 of FIG. 2A, the section 315 can include components such as a light source module, a light uniforming element, etc., which are not further detailed herein. The light transmitting and reflective element 313 has a light splitting face 313a for reflecting the illumination light beam 312 to the light valve 320 and transmitting the image light beam 312a. The light splitting face 313a is for example perpendicular to the X-Y plane. Additionally, the first reflective element 336, the first lens group 332, the light transmitting and reflecting element 313 and the light valve 320 are for example sequentially arranged along the direction of the X axis.

In the present embodiment, the first reflective element 336 does not need to be rotated about the Y axis as the first reflective element 136 of FIG. 2B is. Consequently the image frame is not distorted, so the light valve 320 and the light uniforming element of the illumination system 310 and the light emitting assemblies of the light source module do not need to be rotated as those in the previous embodiment.

Figure 8:
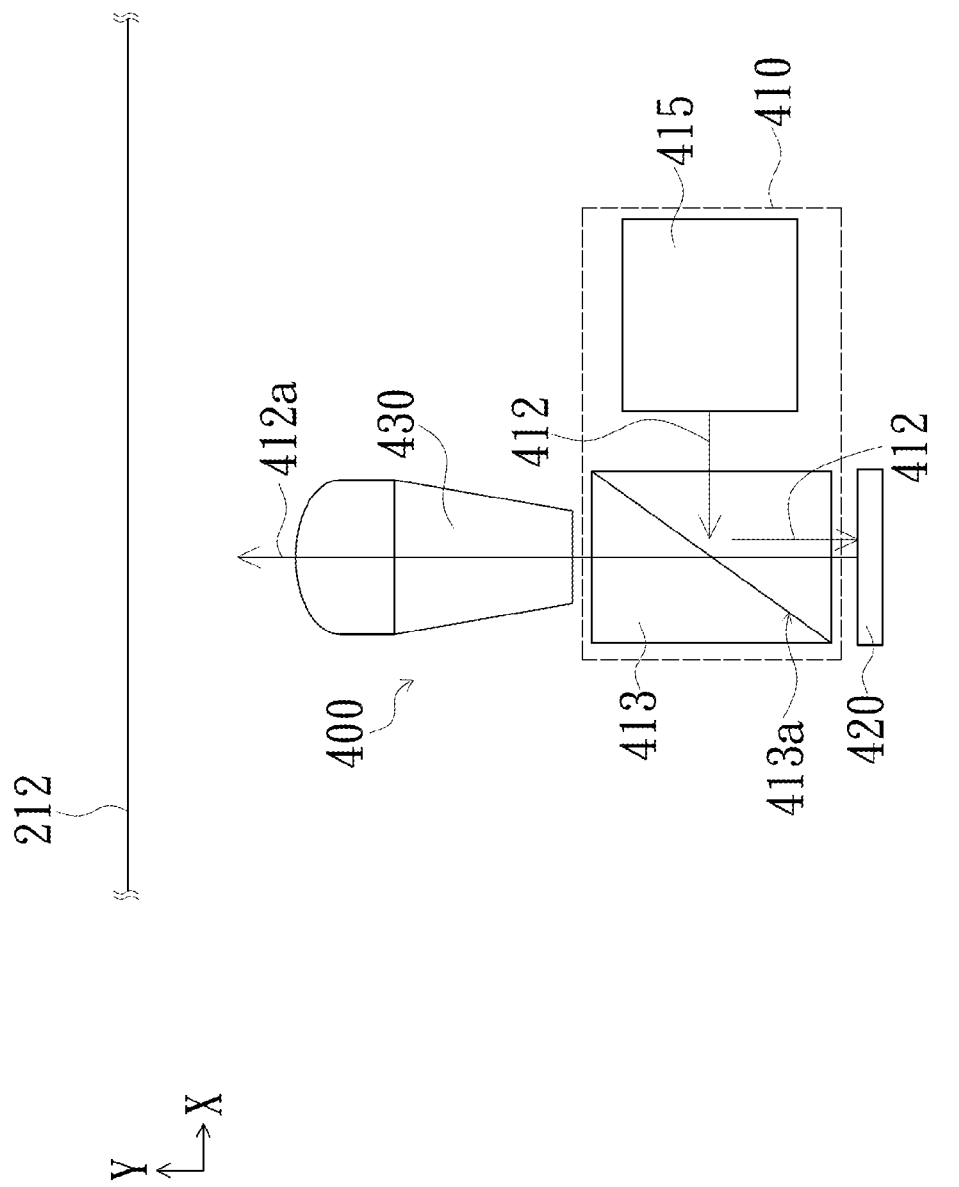
FIG. 8 shows a schematic top view of a projection device according to an embodiment of the present disclosure.

FIG. 8 shows a schematic top view of a projection device according to another embodiment of the present disclosure. Referring to FIG. 8, the projection device 400 of the present embodiment is similar to the abovementioned projection device 100, and can be accommodated into the display platform 210 of FIG. 1. The projection device 400 includes an illumination system 410, a light valve 420, and a projection lens 430. The illumination system 410 provides an illumination light beam 412. The light valve 420 is arranged on the transmission path of the illumination light beam 412, for converting the illumination light beam 412 to an image light beam 412a.

Unlike the projection lens 120 of the aforementioned embodiment, the projection lens 430 of the present embodiment does not include a first reflective element for reflecting the image light beam 412a. Additionally, the illumination system 410 includes a light transmitting and reflecting element 413 and components included in a section 415. Similar to the components included by the section 115 of FIG. 2A, the section 415 can include components such as a light source module, a light uniforming element, etc., which are not further detailed herein. The light transmitting and reflecting element 413 has a light splitting face 413a for reflecting the illumination light beam 412 to the light valve 420 and transmitting the image light beam 412a. The light splitting face 413a is for example perpendicular to the X-Y plane. Additionally, the projection lens 430, the light transmitting and reflecting element 413 and the light valve 420 are for example sequentially arranged along the direction of the Y axis.

Figure 9:
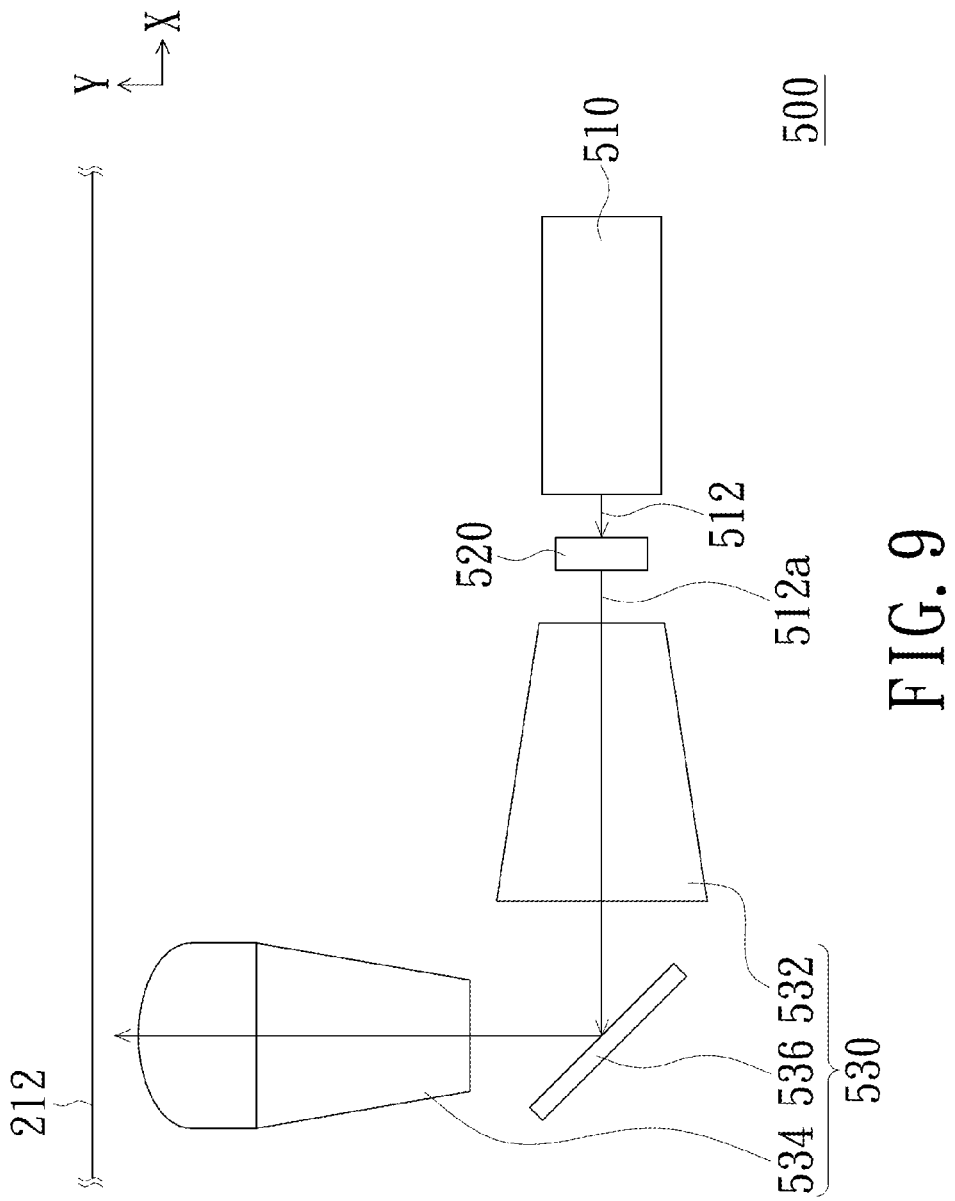
FIG. 9 shows a schematic top view of a projection device according to an embodiment of the present disclosure.

FIG. 9 shows a schematic top view of a projection device according to another embodiment of the present disclosure. Referring to FIG. 9, the projection device 500 of the present embodiment is similar to the abovementioned projection device 100, and can be accommodated into the display platform 210 of FIG. 1. The projection device 500 includes an illumination system 510, a light valve 520, and a projection lens 530. The illumination system 510 provides an illumination light beam 512. The light valve 520 is arranged on the transmission path of the illumination light beam 512, for converting the illumination light beam 512 to an image light beam 512a.

The light valve 520 of the present embodiment is a transmissive light valve, such as a transmissive liquid crystal display panel. Additionally, the projection lens 530 includes a first lens group 532 arranged along the direction of the X axis, a second lens group 534 arranged along the direction of the Y axis, and a first reflective element 536 arranged between the first lens group 532 and the second lens group 534. Additionally, since the projection device 500 uses a transmissive light valve, the illumination system 510 does not need to include the abovementioned light transmitting and reflecting element.

Figure 10:
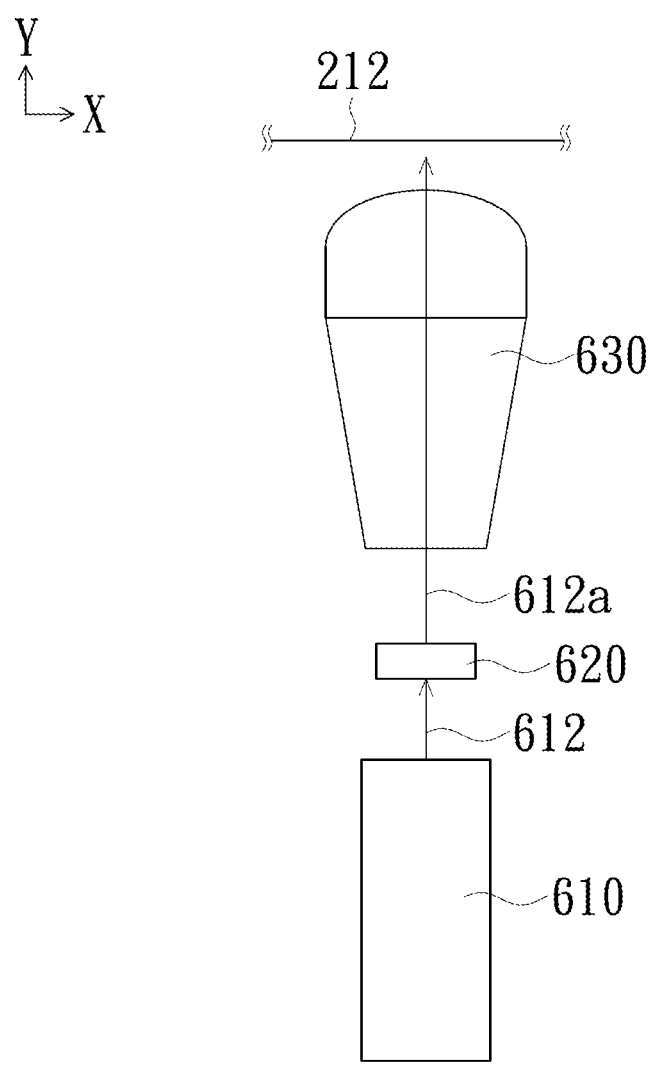
FIG. 10 shows a schematic top view of a projection device according to an embodiment of the present disclosure.

FIG. 10 shows a schematic top view of a projection device according to another embodiment of the present disclosure. Referring to FIG. 10, the projection device 600 of the present embodiment is similar to the abovementioned projection device 500, and can be accommodated into the display platform 210 of FIG. 1. The projection device 600 includes an illumination system 610, a light valve 620, and a projection lens 630. The illumination system 610 provides an illumination light beam 612. The light valve 620 is arranged on the transmission path of the illumination light beam 612, for converting the illumination light beam 612 to an image light beam 612a.

Unlike the projection device 500, all lenses (not shown in the figure) of the projection lens 630 are arranged along the direction of the Y axis, and the projection lens 630 does not include a reflective element for reflecting light. Additionally, the illumination system 610, the light valve 620 and the projection lens 630 are sequentially arranged along the direction of the Y axis.

Figure 11:
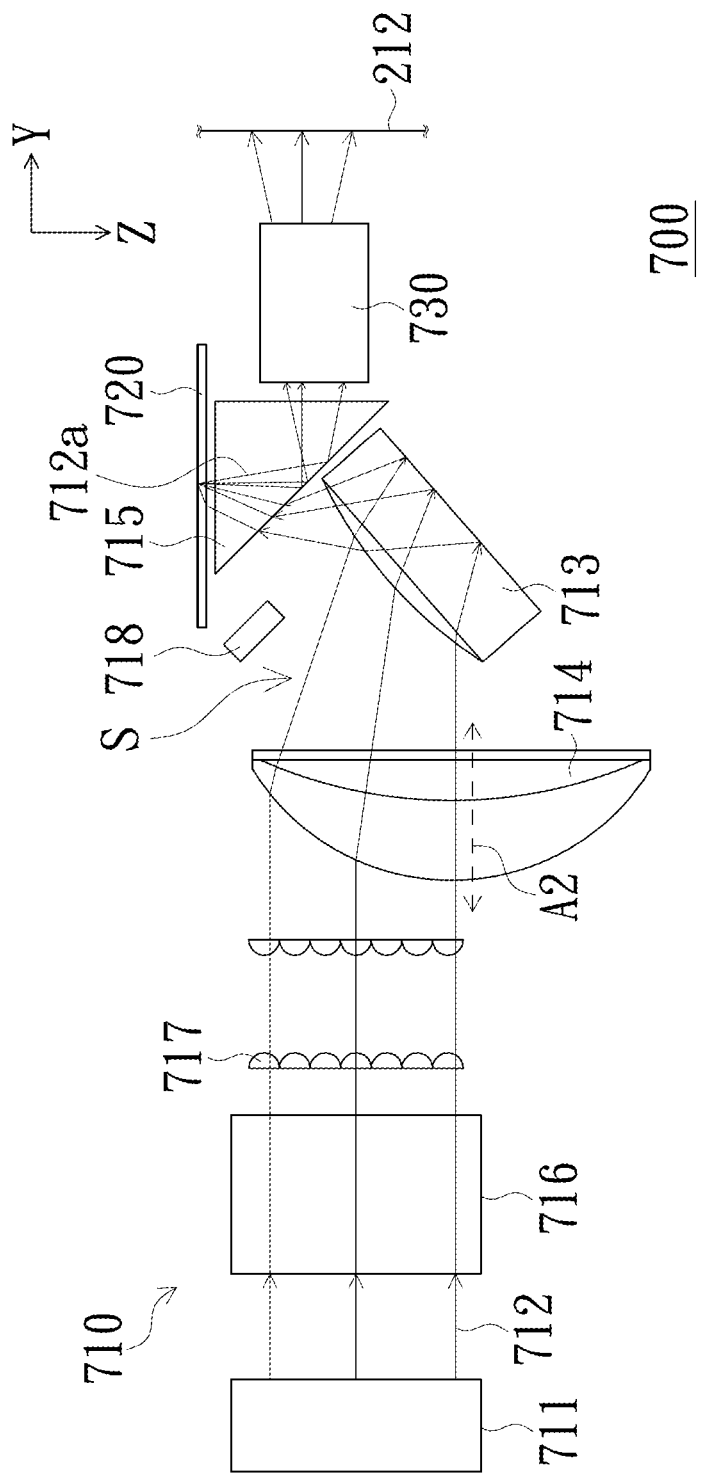
FIG. 11 shows a schematic view of a projection device according to another embodiment of the present disclosure.

FIG. 11 shows a schematic view of a projection device according to another embodiment of the present disclosure. Referring to FIGS. 1 and 11, the projection device 700 includes an illumination system 710, a light valve 720 and a projection lens 730. The illumination system 710 is configured to provide an illumination light beam 712. The light valve 720 is arranged on a transmission path of the illumination light beam 712, for converting the illumination light beam 712 into an image light beam 712a. The projection lens 730 is arranged on a transmission path of the image light beam 712a for projecting the image light beam 712a onto the projection screen 212 and forming the image frame at the projection screen 212.

The illumination system 710 includes a light source module 711, a reflective element 713, a refractive element 714 and a light beam splitter 715. The light source module 711 is configured to provide the illumination light beam 712.

The reflective element 713 is arranged on the transmission path of the illumination light beam 712 to reflect the illumination light beam 712 to the light valve 720. The reflective element 713 can be, but not limited to, a mirror lens.

The refractive element 714 is arranged between the light source 711 and the reflective element 713 to refract the illumination light beam 712 to the reflective element 713. The refractive element 714 can be, but not limited to, an offset lens. That is, the refractive element 714 is a lens whose optical axis A2 is not aligned with an optical axis of the illumination light beam 712, so as to refract the illumination light beam 712.

The light beam splitter 715 is arranged between the light valve 720, the projection lens 730 and the reflective element 713, for splitting the illumination light beam 712 and the image light beam 712a. In the present embodiment, the light beam splitter 715 can be, but not limited to, a reverse total internal reflection prism. For example, the light beam splitter 715 also can be a total internal reflection prism, a polarization beam splitter, or other light beam splitter.

The illumination system 710 can further include a collimator 716 and a light uniforming element 717. The collimator 716 is arranged between the light source module 711 and the refractive element 714. The light uniforming element 717 is arranged between the collimator 716 and the refractive element 714. The light uniforming element 717 can include, but not limited to, at least one micro-lens array. In another embodiment, the light uniforming element 717 can be a light integration rod.

Due to the layout of the projection device 700, the optical axis of the illumination system 710, the optical axis of the projection lens 730 and the light valve 720 need not be arranged slantedly with respect to the X-Y plane, the stray light which is not totally reflected from the light beam splitter 715 can't transmit to the projection lens 730, and the interference between the light valve 720 and the light beam splitter 715 can be avoided. Further, a usable space S is formed between the reflective element 713, the refractive element 714 and the light beam splitter 715, and a light blocking element 718 can be disposed in the usable space S to block stray light. Further, since the light beam splitter 715 can be a single prism, the design of the layout of the projection device 700 is easier. Moreover, a field lens arranged between the light valve 720 and the light beam splitter 715 can be optionally omitted. However, in another embodiment, the illumination system 710 can further include the field lens arranged between the light valve 720 and the light beam splitter 715.

Figure 12:
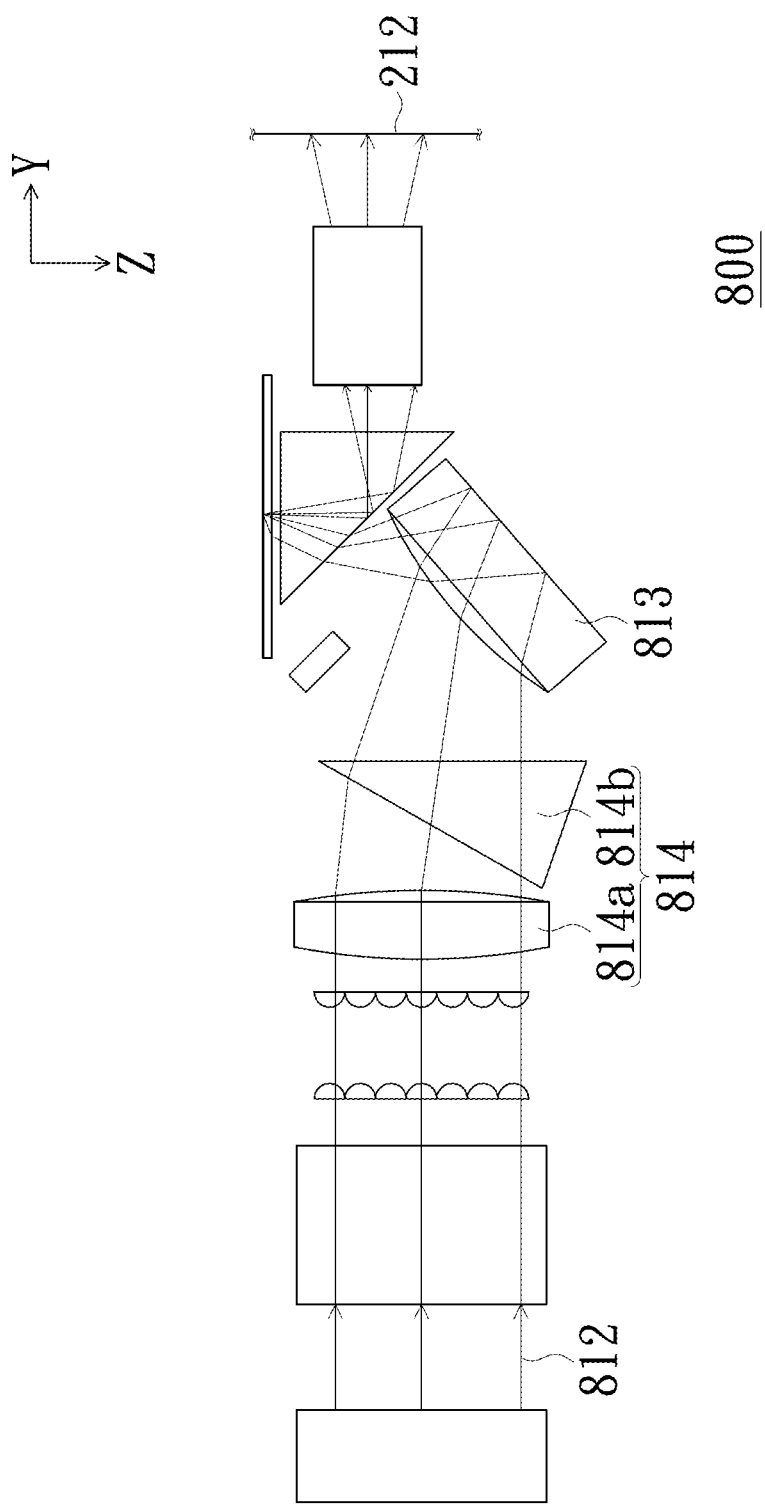
FIG. 12 shows a schematic view of a projection device according to another embodiment of the present disclosure.

FIG. 12 shows a schematic view of a projection device according to another embodiment of the present disclosure. Referring to FIG. 12, the projection device 800 of the present embodiment is similar to the abovementioned projection device 700, and can be accommodated into the display platform 210 of FIG. 1. The difference between the projection devices 700 and 800 is the refractive element. More specifically, the refractive element 814 includes a non-offset lens 814a and a refractive prism 814b arranged between the non-offset lens 814a and the reflective element 813. The refractive prism 814b is configured to refract the illumination light beam 812 to the reflective element 813.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projection system, comprising:
a display rack having a plurality of display platforms, at least one of the display platforms having a projection screen;
a projection device, disposed in the display platform having the projection screen, for directly forming an image frame onto the projection screen, wherein a length of the image frame in a first direction is greater than or equal to ten times a length of the image frame in a second direction, the projection device comprising:
an illumination system for providing an illumination light beam;
a light valve arranged on a transmission path of the illumination light beam, for converting the illumination light beam into an image light beam; and
a projection lens arranged on a transmission path of the image light beam for projecting the image light beam onto the projection screen and forming the image frame at the projection screen,
wherein, the image light beam is not reflected by any reflective mirror arranged between the projection lens and the projection screen.

2. The projection system according to claim 1, wherein the projection lens includes a first lens group arranged along the first direction, a second lens group arranged along a third direction, and a first reflective element arranged between the first lens group and the second lens group, and an optical axis of the first lens group and the first direction include a first angle.

3. The projection system according to claim 2 wherein the first angle is θ1, and $3° \leq (0.72 \times |\theta1| \times L)/(H \times f/\#) \leq 8°$, wherein L is a distance between a center of a reflective face of the first reflective element and a center of an object face of the light valve, H is a length of the projection screen in the second direction, and f/# is an F number of the projection lens.

4. The projection system according to claim 2, wherein a long edge of an object face of the light valve and the third direction include a second angle, and the second angle is equal to the first angle.

5. The projection system according to claim 2, wherein the illumination system comprises:
a light source module for providing the illumination light beam;
a light transmitting and reflecting element arranged between the light valve and the projection lens, for reflecting the illumination light beam to the light valve and transmitting the image light beam to the projection lens;
a second reflective element arranged under the light transmitting and reflecting element, for reflecting the illumination light beam to the light transmitting and reflecting element; and
a light uniforming element, arranged between the light source module and the second reflective element.

6. The projection system according to claim 5, wherein the light uniforming element has a light emitting face, the light emitting face and the third direction includes a third angle, and the third angle is equal to the first angle.

7. The projection system according to claim 5, wherein the light uniforming element includes two micro-lens arrays separated by a distance.

8. The projection system according to claim 5, wherein the light source module comprises:
a plurality of light emitting assemblies for providing illumination light beams of different colors;
a light combining element arranged between the light emitting assemblies; and
a third reflective element arranged between the light combining element and the light uniforming element for reflecting the illumination light beam to the light uniforming element.

9. The projection system according to claim 8, wherein the light emitting assemblies each have a light emitting face, a long edge of each of the light emitting faces and the first direction include a fourth angle, and the first angle is equal to the fourth angle.

10. The projection system according to claim 2, wherein an F number of the projection lens is less than or equal to 2.0 or a resolution of the projection lens is greater than or equal to 1080P.

11. The projection system according to claim 2, wherein the first direction is perpendicular to the second direction.

12. The projection system according to claim 2, wherein a throw ratio of the projection lens is smaller than or equal to 0.4.

13. A projection device being disposable into a display platform of a display rack having a plurality of display platforms, and used for projecting an image frame onto a projection screen of the display platform, wherein a length of the image frame in a first direction is greater than a length of the image frame in a second direction, the projection device comprises:
an illumination system for providing an illumination light beam;
a light valve arranged on a transmission path of the illumination light beam, for converting the illumination light beam into an image light beam; and a projection lens arranged on a transmission path of the image light beam for projecting the image light beam onto the projection screen and forming the image frame at the projection screen, wherein the projection lens includes a first lens group arranged along the first direction, a second lens group arranged along a third direction, and a first reflective element arranged between the first lens group and the second lens group, and an optical axis of the first lens group and the first direction include a first angle.

14. The projection device according to claim 13 wherein the first angle is θ1, and $3° \leq (0.72 \times |\theta1| \times L)/(H \times f/\#) \leq 8°$, wherein L is a distance between a center of a reflective face of the first reflective element and a center of an object face of the light valve, H is a length of the projection screen in the second direction, and f/# is an F number of the projection lens.

15. The projection device according to claim 13, wherein a long edge of an object face of the light valve and the third direction include a second angle, and the second angle is equal to the first angle.

16. The projection device according to claim 13, wherein the illumination system comprises:
    a light source module for providing the illumination light beam;
    a light transmitting and reflecting element arranged between the light valve and the projection lens, for reflecting the illumination light beam to the light valve and transmitting the image light beam to the projection lens;
    a second reflective element arranged under the light transmitting and reflecting element, for reflecting the illumination light beam to the light transmitting and reflecting element; and
    a light uniforming element, arranged between the light source module and the second reflective element.

17. The projection projection device according to claim 16, wherein the light uniforming element has a light emitting face, the light emitting face and the third direction includes a third angle, and the third angle is equal to the first angle.

18. The projection projection device according to claim 16, wherein the light source module comprises:
    a plurality of light emitting assemblies for providing illumination light beams of different colors;
    a light combining element arranged between the light emitting assemblies; and
    a third reflective element arranged between the light combining element and the light uniforming element for reflecting the illumination light beam to the light uniforming element.

19. The projection projection device according to claim 18, wherein the light emitting assemblies each have a light emitting face, a long edge of each of the light emitting faces and the first direction include a fourth angle, and the first angle is equal to the fourth angle.

20. A display rack comprising:
    a plurality of display platforms; and
    at least one of a projection device disposed into at least one of the display platform, wherein the projection device is used for projecting an image frame onto a projection screen of the display platform, a length of the image frame in a first direction is greater than a length of the image frame in a second direction, the projection device comprising:
        an illumination system for providing an illumination light beam;
        a light valve arranged on a transmission path of the illumination light beam, for converting the illumination light beam into an image light beam; and
        a projection lens arranged on a transmission path of the image light beam for projecting the image light beam onto the projection screen and forming the image frame at the projection screen,
        wherein the projection lens includes a first lens group arranged along the first direction, a second lens group arranged along a third direction, and a first reflective element arranged between the first lens group and the second lens group, and an optical axis of the first lens group and the first direction include a first angle.

* * * * *